(Model.)

2 Sheets—Sheet 1.

J. C. CRAIG.
COMBINED LATCH AND LOCK.

No. 338,141. Patented Mar. 16, 1886.

Witnesses:
John Grist
C. G. Pinnock

Inventor:
J. C. Craig
By Henry Grist
Atty.

(Model.)
2 Sheets—Sheet 2.
J. C. CRAIG.
COMBINED LATCH AND LOCK.
No. 338,141. Patented Mar. 16, 1886.
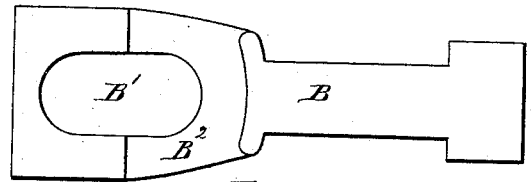
Fig. 5.
Fig. 6.
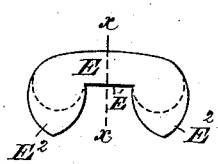  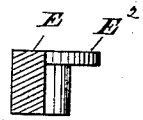
Fig. 7.  Fig. 8.  Fig. 9.
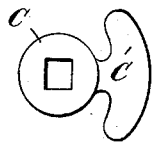  
Fig. 10.  Fig. 11.  Fig. 12.
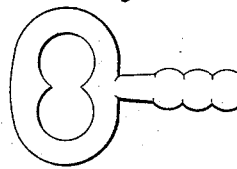
Fig. 13.
Witnesses:
John Grist
C. G. Pennock
Inventor:
J. C. Craig
By Henry Grist
Att'y.
N. PETERS, Photo-Lithographer, Washington, D. C.

UNITED STATES PATENT OFFICE.

JOHN CHARLES CRAIG, OF FENELON FALLS, ONTARIO, CANADA, ASSIGNOR OF ONE-HALF TO EDWARD DEANES HAND, OF SAME PLACE.

COMBINED LATCH AND LOCK.

SPECIFICATION forming part of Letters Patent No. 338,141, dated March 16, 1886.

Application filed July 11, 1885. Serial No. 171,312. (Model.)

*To all whom it may concern:*

Be it known that I, JOHN CHARLES CRAIG, of the village of Fenelon Falls, in the county of Victoria, province of Ontario, and Dominion of Canada, have invented certain new and useful Improvements in a Combined Latch and Lock; and I do hereby declare that the following is a full, clear, and exact description of the same.

My invention consist of a lock-case having an arc projection on the inside above the key-hole, a latch-bolt shot by a gravitating lever having a curved slot, and a gravitating dog sliding therein retracted by a key, whereby the latch-bolt is shot by gravitation of the lever, and the lever and bolt locked by the dog engaging the arc projection. When the lever is released, the latching-bolt is operated by a trippet and knob-spindle.

Figure 1:
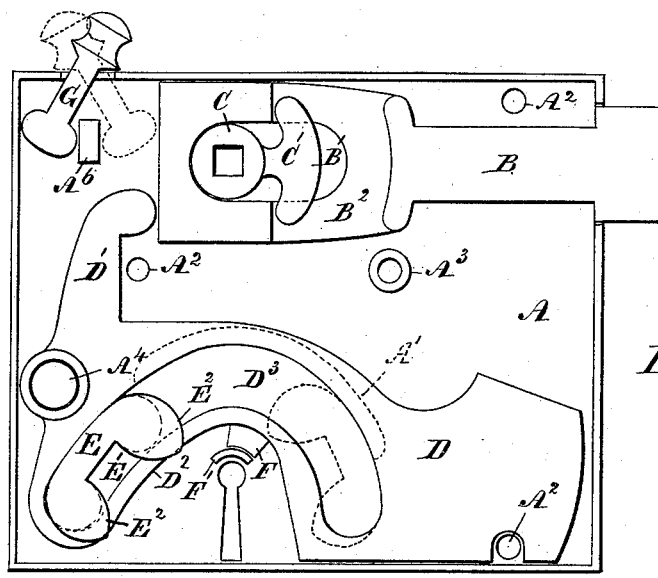
Figure 2:
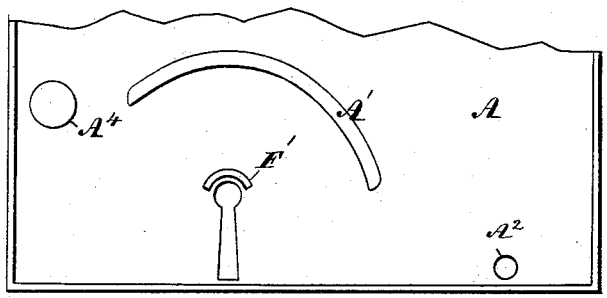
Figure 3:
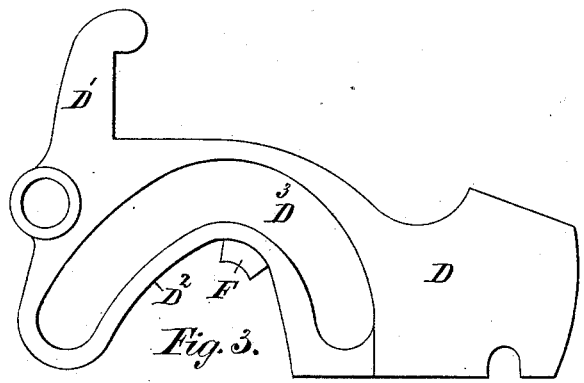
Figure 4:
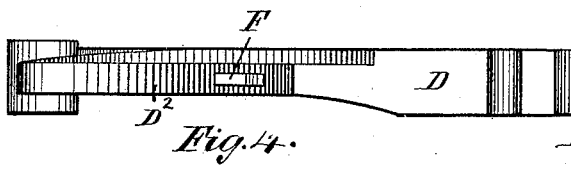

Figure 1 is a plan of my improved latch and lock, the cover-plate removed. Fig. 2 is a plan of a portion of the lock-case. Fig. 3 is a plan of the gravitating lever removed from the case. Fig. 4 is a view of the lower edge of the same. Fig. 5 is a plan of the bolt removed from the case. Fig. 6 is a side view of the same. Fig. 7 is a top view of the locking-dog. Fig. 8 is a side view of the same. Fig. 9 is a section on line $x\ x$, Fig. 7. Fig. 10 is a top view of the socket and trippet removed from the bolt. Fig. 11 is a side elevation of the same. Fig. 12 is a side elevation of the independent locking-bar removed from the case. Fig. 13 is an elevation of the key.

A is the lock-case, having a curved projection, A', on the inside to form an arc above the key-hole.

$A^3$ is a central post to receive a screw to fasten the cover-plate to the case, and $A^2$ are holes to fasten the lock to a door by screws.

B is the latch-bolt, provided with a longitudinal slot, B', intersected by a notch, $B^2$, to receive a socket, C, for the knob-spindle, and which socket is provided with a trippet, C', which in thickness is somewhat less than the depth of the notch, so as to move freely therein. The ends of the socket fit into holes in the lock-case and cover. When the socket is turned by a knob-spindle, one of the ends of the trippet will encounter the wall of the notch and thrust latch-bolt B inwardly.

By removing bolt B and spindle-socket C bodily and inverting the same, to reverse the bevel of the latch-bolt, the lock may be applied to a door hinged to the jamb on either side or opening either inward or outward, whereby the bevel edge will slide freely over the keeper on the jamb without requiring the knob to be turned in order to close the door.

D is a lever pivoted on a post, $A^4$, cast with the lock-case, and said lever has an arm, D', engaging with the inner end of latch-bolt B, whereby the gravitation of the lever will shoot bolt B; but when the weight of the lever is overcome by the inward movement of the bolt, caused by turning the knob-spindle, the free end of the lever will rise in the lock-case, and be prevented from interference with bolt B by striking against post $A^3$.

Lever D has a curved recess, $D^2$, on its lower side, to allow admission of a key from either face of the lock, and concentrically with the curve of said recess, lever D has a curved slot, $D^3$, a portion of the lever above said slot being hollowed out to pass over the curved projection A', to allow the lever to rise when the latch is not locked. The lower face of the projection A' is parallel to the upper curve of slot $D^3$ when the lever is at rest. The portion of the lever below slot $D^3$ is reduced on the opposite sides to allow the webs 2 3 of a key, Fig. 13, access to a dog, E, when turning the key. The dog E slides in slot $D^3$ of lever D when operated by the key, and said dog has a notch, E', on the face toward the key-hole, and flanges $E^2$ at both ends to overlie the lever in a direction toward the key-hole, so that when the key is inserted web 2 of the key will engage with the front flange and lift the dog over the crown of slot $D^3$, when the dog will gravitate to the end of the slot to engage projection A' on the lock-case and prevent lever D from rising, thereby locking bolt B by arm D'. When the dog is at the opposite end of the slot, the lever will be free to rise over projection A' when bolt B is retracted by rocking the knob-spindle.

F is a ward secured to the crown of the recess $D^2$ of lever D, and F' is a ward attached to the lock-case, the latter fitting into one of the slots 4 5 and the former into slot 6 of the key; but other arrangements of the wards may be used, those shown being examples; or the wards may be dispensed with to cheapen the lock.

G is a movable bar, hung by its head in a slot in the top of case A, above a post, $A^6$, in rear of bolt B, to stop said bolt when the enlarged lower end of the bar is placed to occupy the space between the post and end of the bolt, as shown in dotted lines, such adjustment being effected by pulling the bar upwardly in the slot and passing its lower end over the post. When not desired to lock the bolt, the bar is pulled up and its lower end passed to the opposite side of the post. The bolt may thus be locked from the inside of a room should it not be desirable to use the key to lock the lever.

I claim as my invention—

In a latch and lock, the combination, with case A, having a curved projection, A', of the sliding bolt B, having slot B' and notch $B^2$, socket C, having trippet C', lever D, having arm D' and curved slot $D^3$, and dog E, sliding in said slot to engage with projection A', for locking the lever and bolt by appliance of a key, as set forth.

JOHN CHARLES CRAIG.

Witnesses:
 WILLIAM LETTS,
 W. McKEOWN.